Aug. 15, 1967  J. A. SOMBARDIER  3,336,470
VEHICLE HEADLIGHTS ADJUSTING DEVICES
Filed Nov. 19, 1964  4 Sheets-Sheet 2
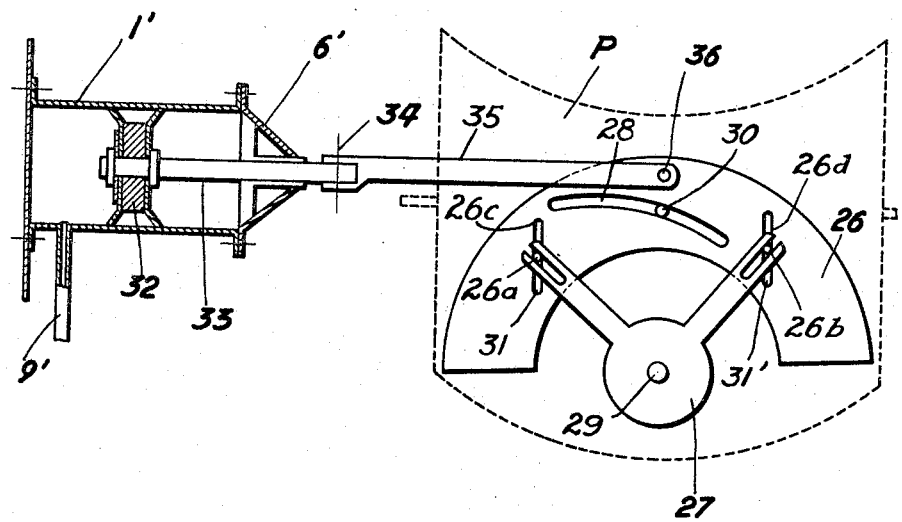
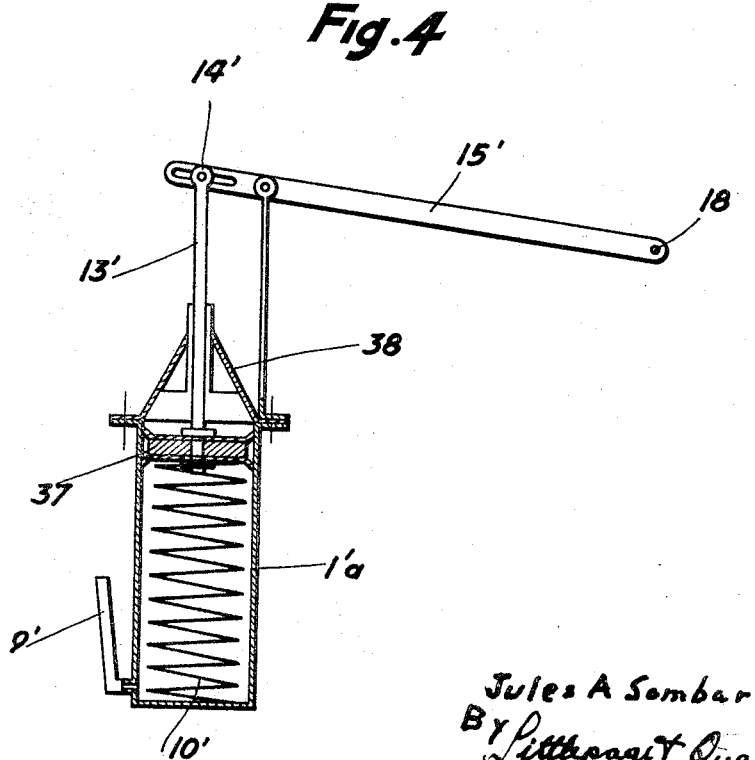
Jules A Sombardier
BY
Littlepage & Quaintance
Attys.

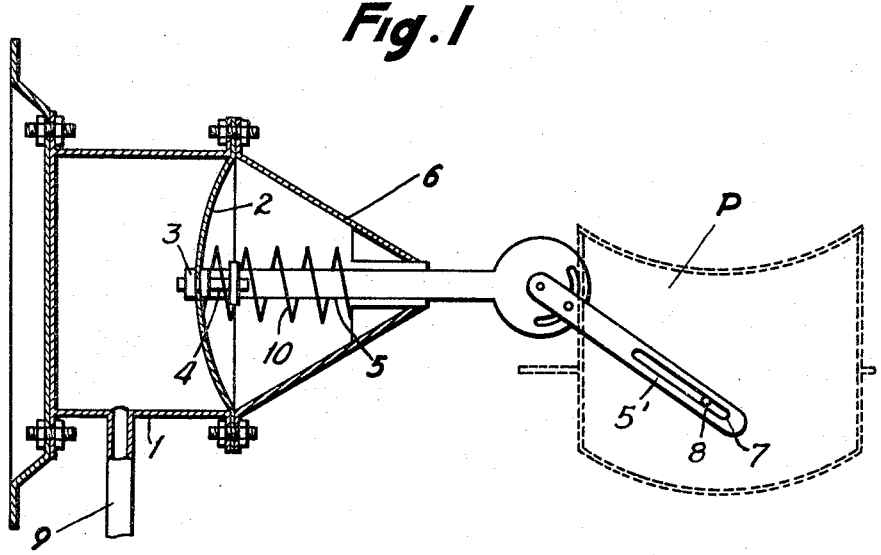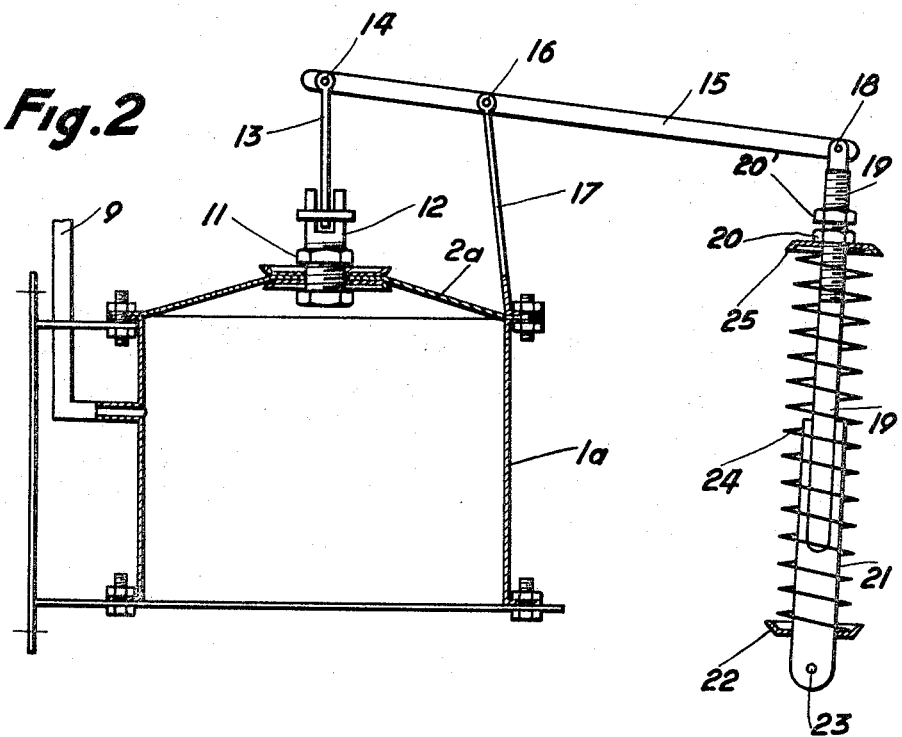

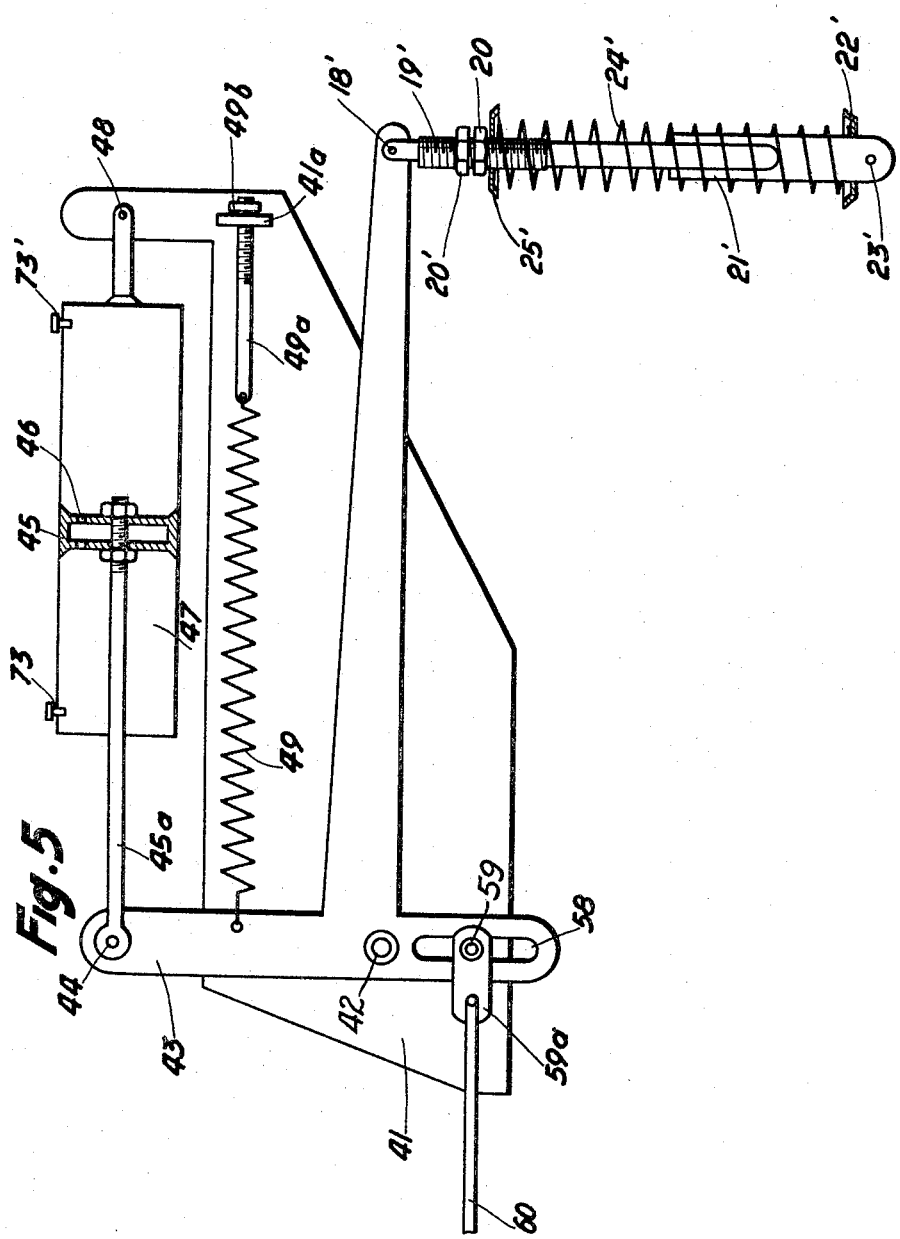

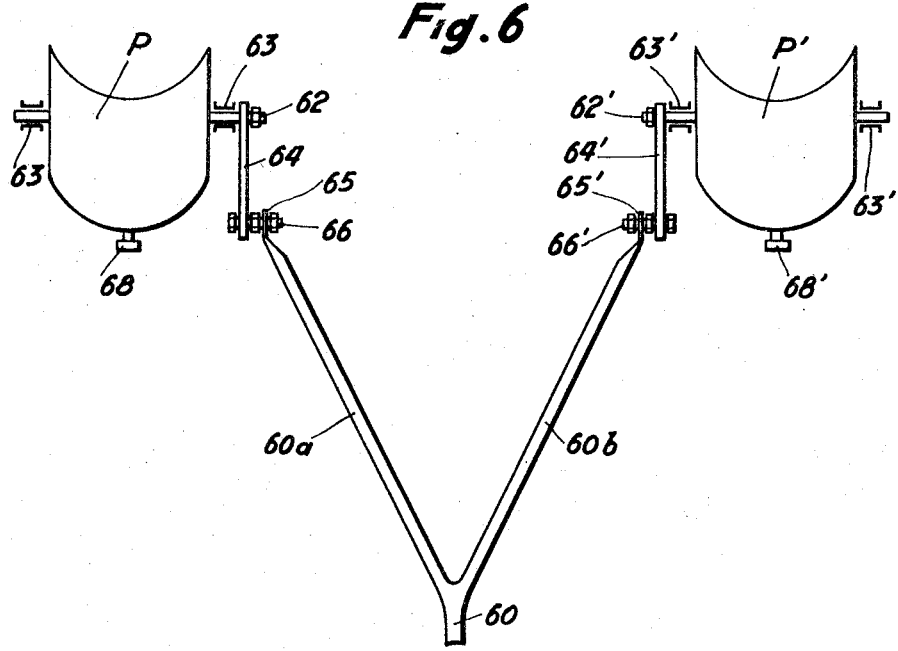
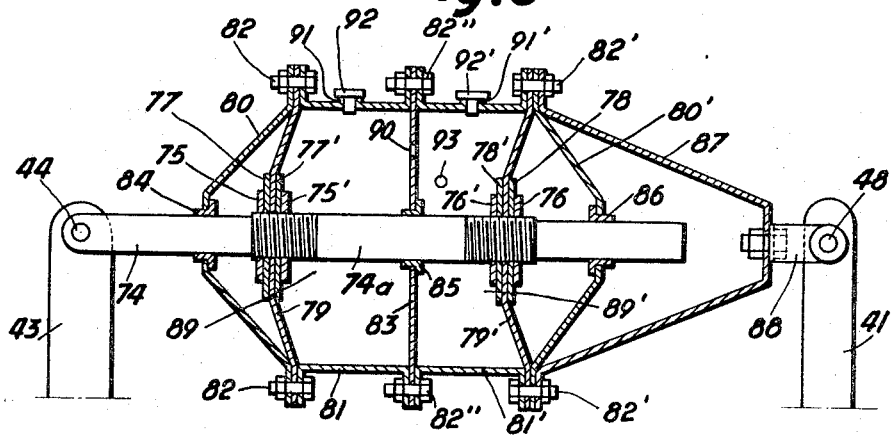
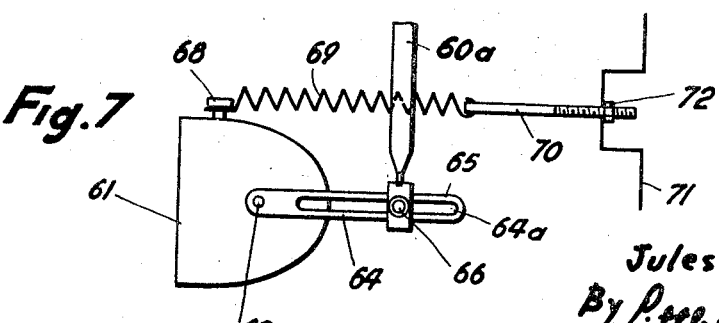

3,336,470
VEHICLE HEADLIGHTS ADJUSTING DEVICES
Jules Antonin Sombardier, Pau, France, assignor to Projecteurs Cibie Societe Anonyme, Bobigny, Seine, France, a corporation of France
Filed Nov. 19, 1964, Ser. No. 412,548
Claims priority, application Tunisia, Nov. 22, 1963, 10,677
3 Claims. (Cl. 240—7.1)

The present invention relates to a semi-hydraulic device which enables the beams from vehicle headlights to be adjusted automatically in relation to the road, whatever the load in the said vehicles and however lowered they may be at the rear.

It is known that headlights are adjusted according to the normal load of the vehicle and that, in the case where the vehicle only bears the weight of the driver, the rear end rises and thus shortens the range of beams from the headlights which are fixed to the body of the vehicle.

This decrease in the range of headlights forces the driver of the vehicle to reduce speed as a function of the length of road in front of the vehicle which is illuminated. This inconvenience is especially marked when the lights are dipped.

Furthermore it is impossible to adjust the headlights of a vehicle properly when it is empty because as soon as it receives any additional weight the rear of the chassis is lowered proportionally and the beams from its headlights are lengthened and blind drivers coming in the opposite direction.

The main object of the present invention is to provide a device which maintains the beams from headlights of automobile vehicles at a constant height whatever the load and the lowering of the rear of the body.

A device according to the present invention comprises, first, a mechanism adapted to transmit the variations in height from the ground of the rear of the vehicle when loads are introduced into it, said mechanism consisting of a mechanical means connected to the chassis above the rear wheels and acting resiliently on a pivoting lever connected by means such as a cable or the like to levers which cause the headlights, which are mounted on horizontal pivots, to swing in a vertical plane; and second, moderating means consisting of a hydraulic damper inserted between the said pivoting lever and a fixed point of the chassis in order that all intrusive movements due to the vehicle's jolting are only taken up by the elastic part of the transmitting mechanism and are not transmitted to the headlights.

The moderating means may consist of an hydraulic damper comprising a rod connected at one end to said pivoting lever and at the other end with an elastic diaphragm which seals a first sump filled with a liquid and attached to the chassis of the vehicle near a headlight, said first sump communicating by means of a pipe with a second sump attached to the said chassis above the rear wheel-train and sealed by a diaphragm connected to the rear wheel-train through resilient means, adjustable restricting means being provided on the pipe to control the flow of liquid as it passes from one sump to the other.

The moderating means may also consist of an hydraulic damper comprising a rod connected at one hand to said pivoting lever and on the other hand with two elastic diaphragms placed one on each side of a rigid wall through which passes said rod in a liquid tight manner and which divides an enclosure filled with liquid into two chambers, said diaphragm forming mobile terminal walls for said chambers, and said dividing wall being provided with a calibrated opening which controls the flow of liquid from one chamber to the other, thereby controlling the movements of said rod.

The moderating means may also consist of an hydraulic piston damper, the cylinder of which is attached to the chassis, whilst the piston rod is connected to an arm of said pivoting lever, the piston having a calibrated opening which controls the flow of a liquid contained in the cylinder from one side of the piston to the other when said piston moves in the cylinder.

Preferably, an adjustable tension spring bears on the pivoting lever of the mechanical transmitting mechanism and brings it back to the position at which the angle of the headlight is set when the vehicle is not loaded in the rear.

Various embodiments of the invention are described in greater detail hereinafter, with reference to the appended drawing in which:

FIGURE 1 is a diagrammatic, sectional view of a first embodiment of a hydraulic device for controlling the tilt of a headlight;

FIGURE 2 is a similar view of a semi-hydraulic transmitting mechanism connected to the controlling device of FIGURE 1;

FIGURES 3 and 4 are similar views of a second embodiment of the said controlling and transmitting mechanism, respectively;

FIGURE 5 is a side elevational, part sectional, diagrammatic view of a modification of the semi-hydraulic transmitting mechanism;

FIGURE 6 is an elevational view, from above, of the part of the device of FIGURE 5 which is fitted to the front of the vehicle;

FIGURE 7 is a side elevational view of one of the headlights and the tilting system thereof;

FIGURE 8 is a longitudinal sectional view of another embodiment of the moderating means in a device according to the invention.

In the embodiment of FIGURES 1 and 2, a cylindrical sump member 1 is attached to the chassis of a vehicle (not shown) at a suitable place near a headlight. Sump 1 is closed by a resilient diaphragm 2 in the center of which is attached a clamping member 3 carrying a stud 4. To said stud 4 is attached a link 5 on the free end of which is secured an arm 5'. The angle formed by link 5 and arm 5' may be varied, arm 5' being held by means of a bolt 5b engaged in a circular slot 5a. A cone shaped cover member 6 is secured on sump 1 in front of a diaphragm 2 and acts as a guide for link 5. The free end of arm 5' is provided with a slot 7 in which is slidably engaged a stud 8 provided on the headlight p shown in dotted lines said headlight p being oscillatingly mounted about a transverse axis contained in the plane of FIGURE 1 and placed at an angle with arm 5. A coil spring 10 urges diaphragm 2, and therefore link 5 towards sump 1.

A tube 9 leads from sump 1 to another cylindrical sump 1a, attached to the chassis of the vehicle above the rear wheel-train. In the same manner as the above described sump 1, sump 1a is closed by a resilient diaphragm 2a. A connecting member 11 is secured at the center of diaphragm 2a and carries a fork 12 on which is mounted a rod 13 connected at its other end at 14 to a lever 15.

Lever 15 is oscillatingly connected at 16 to a supporting member 17 extending from sump 1a and is connected at 18 to a partly threaded rod 19 onto which are screwed a nut 20 and a lock nut 20'. The unthreaded portion of rod 19 is slidingly mounted in a tube 21 carrying a shoulder forming washer 22. Tube 21 is oscillatingly connected at 23 to the rear axle or like member of the vehicle by means of a socket member, not shown. A coil spring 24 is arranged on rod 19 and tube 21 between washer 22 of tube 21 and a washer 25, resting against nut 20 on rod 19. Nuts 20 and 20' are used to adjust the tension of spring 24.

Both sumps 1 and 1a and the connecting pipe 9 therebetween are filled with a hydraulic fluid such as oil. A diaphragm (not shown) provided with one or more small apertures is placed in pipe 9 in order to provide for a sufficiently slow flowing of said fluid from one sump to the other, and thus avoid uncontrolled swinging of the headlight beams when the vehicle jolts over bumps in the road. Due to the antagonistic action of springs 10 and 24 a constant pressure of the hydraulic fluid is maintained in sump 1 and 1a and in pipe 9 and the two diaphragms 2 and 2a are constantly under the direct action of said pressure, the fluid flowing in one direction or the other as soon as the force exerted by spring 24 increases or decreases.

If the headlights are not linked together it is of course necessary to use two systems of the type shown in FIGURE 1, one for each headlight and adjacent thereto.

The above described device operates as follows:

The hydraulic system formed of sumps 1 and 1a and of pipe 9 being filled with a hydraulic fluid such as oil and the like, the headlights are adjusted with no load in the vehicle other than the driver. When an additional load is placed in the rear part of the vehicle the chassis is lowered at the rear in proportion with the value of said load and the distance between said chassis and the rear axle or the like therefore decreases. When this occurs rod 19 which is carried by the chassis through sump 1a, and tube 21 which is carried by the rear axle tend to slide within one another and to compress spring 24. Said spring tends in its turn to push back rod 19 which causes lever 15 to swing about connection 16. Rod 13 is therefore caused to compress diaphragm 2a which forces part of the liquid contained in sump 1a through pipe 9 into sump 1, placed near the headlight.

Under the action of the pressure of this liquid the central part of diaphragm 2 is moved towards the right as shown in FIGURE 1 and pushes link 5 and arm 5' in the same direction while compressing spring 10 guided in member 6. Cooperation between slot 7 in arm 5' and stud 8 on headlight $p$ causes the progressive tilting of said headlight $p$ as a function of the load carried by the vehicle.

When the rear of the vehicle is unloaded the fluid flows back from sump 1 to sump 1a under the action of spring 10 and headlight $p$ tilts back the other way. The level and therefore the range of the beams of the headlights are thus maintained at a constant height in relation to the road however much the rear of the vehicle may be lowered.

FIGURE 3 shows a modification of the system which controls the headlight. In said modification, an arcuate plate member 26 is carried by a two armed lever 27 by means of two bolts 26a and 26b which engage two slots 26c and 26d in said arcuate plate member 26 and two slots 31 and 31' in the arms of lever 27 respectively. Lever 27 is pivoted at 29 on the body of the vehicle.

Arcuate plate 26 has a curved slot 28 which is off-centered with respect to 29, and in which engages a stud 30 carried by the headlight. Iotation of lever 27 and plate 26 about 29 causes the shifting of stud 30 frontwards or backwards and a corresponding tilting of the headlight.

Sump 1' is built as a cylinder in which is slidably mounted a hydraulic piston 32, having a rod 33 which slides in a guide member 6' and is connected at 34 to a link 35 the other end which is connected at 36' with plate 26.

A pipe 9' connects sump 1' with a similar sump 1'a (FIGURE 4) placed at the back of the vehicle and attached to the body thereof above the rear axle or the like.

In said sump 1'a is slidably mounted a hydraulic piston 37 and a coil spring 10' is arranged between the bottom of sump 1'a and said piston 37.

To said piston 37 is attached a rod 13' sliding in a guide member 38 and connected at 14' to a lever 15'. The remainder of the device (not shown) is identical with that shown at FIGURE 2 and hereabove described.

FIGURE 5 shows another embodiment of the tranmitting system. In this embodiment, a plate member 41, is attached to the body of the vehicle above the rear axle.

Said plate 41 is fixed and carries a trunnion 42 on which a three-armed lever 43 is pivotally mounted to the upper arm of said lever 43 is connected at 44. The rod 45a of a piston 45 provided with an aperture 46, said piston being slidably mounted within an hermetically sealed cylinder 47 filled with an hydraulic fluid such as oil. Said cylinder 47 is connected at 48 with an extension of plate 41.

A spring 49 is secured, at one end to the same upper arm of lever 43 and at the other end to a threaded rod 49a passing through a bracket 41a provided on member 41 and held by a nut 49b which is screwed thereon. The tension of spring 49 may be adjusted by means of nut 49b.

The end of the lateral arm of lever 43 is connected at 18' with the upper end of a partly threaded rod which is slidably mounted in a tube 21' carrying a shoulder-forming washer 22'. At its lower end tube 21' is connected at 23' to a part of the vehicle integral with the rear-axle. A coil spring 24' is arranged on rod 19' and tube 21' between shoulder 22' and an upper annular ring 25' held by nuts 20 and 20' on rod 19' and by means of which the tension of the spring may be adjusted.

In the lower vertical arm of lever 43 is provided a slot 53 in which is slidably mounted a shouldered and threaded stud 59 which can be held in a given position in said slot by means of a nut. Said stud is carried by a connecting member 59a on which one end of a cable 60 is attached.

At its other end, (FIG. 6) cable 60 divides into two branches 60a and 60b which are connected to the headlights P and P' of the vehicle, respectively. Headlights P and P' are mounted on horizontal trunnions 62 and 62' pivotally mounted in bearings 63 and 63' carried by the body of the vehicle.

Levers 64, 64' are keyed on trunnions 62, 62' on one side of each headlight, and the ends of the two branches 60a and 60b of cable 60 are connected to the ends of said levers by means of connecting members 65 and 65' and studs 66, 66', respectively. As shown at FIGURE 7, stud 66 engages through a slot 64a provided in lever 64 and may be held therein at a selected position by means of a nut 67. A coil spring 69 extends between a stud 68 carried by headlight P and one end of a threaded rod 70 passing through a bracket 72 attached to the body of the vehicle. A nut 72 allows the tension of spring 69 to be adjusted.

The connection between branch 60b of cable 60 and headlight P' is obtained in the same manner.

The springs 69 may be placed at other points on the device which tilts the headlights provided that they have the same effect, that is, cause levers 64 and 64' to exert a permanent traction on branches 60a and 60b of cable 60.

In the case where the two headlights are coupled as a unit, e.g. by means of a transversal bar, the device is more simple and only requires one lever 64 and a single spring 69, cable 60 being directly connected to said lever 64 without having to be divided in two branches.

Portholes closed by stoppers 73, 73$_2$ (FIG. 5) are provided to fill the chambers on each side of piston 45 in cylinder 47 with hydraulic fluid. The headlights having been normally adjusted with no load in the vehicle, when a load is placed at the rear part of the same, said rear parts sink in proportion with said load. Tube 21' then (FIG. 5) slides with respect to rod 19' and compresses spring 24' which tends to push rod 19' upwards. Said rod 19' then transmits a movement in the same direction to lever 43 and causes it to rock about connection 42, whereby a traction is exerted on cable 60. Branches 60a and 60b of said cable pull levers 64 and 64' downwards, which causes the headlights to tilt as a function of the lowering of the rear of the body of the vehicle, whereby the range of the beams of light from the headlights is kept constant in relation to the road.

During this operation piston 45 connected to lever 43 slides in cylinder 47 connected to plate member 41, said sliding movement taking place at a reduced speed due to slow flowing of the hydraulic fluid through opening 46. This hydraulic unit therefore slows down movement of lever 43 and acts as moderating means in the connection between the device and the headlights, to prevent the headlights from swinging constantly when the vehicle jolts or bumps. In the case of such jolting or bumping spring 55 is only compressed for a short period of time and as only a negligible quantity of liquid can pass through hole 46 of piston 45 during said period the lever only swings to an insignificant extent. The same moderating action is obtained by means of the checking of the flow of the hydraulic fluid through pipe 9 or 9' in the devices of FIGURES 1, 2 and 3, 4, or through said moderating means allow the tilting of the headlights downwards or upwards to be spread over a certain lapse of time and is therefore a very important part of the device, which otherwise could not be put to practical use.

Numerous modifications of the hereinabove described embodiment of said moderating means as shown at FIGURE 5 may be easily imagined.

An example of another possible embodiment is shown at FIGURE 8.

In said embodiment lever 43 is connected at 44 to a rod 74, having a central portion 74a of slightly enlarged diameter. Both ends of said central portion are threaded to receive nuts 75, 75', and 76, 76' respectively which nuts serve to clamp two diaphragms 79 and 79' between washers 77, 77' and 78, 78', respectively.

The circumferential edges of diaphragms 79 and 79' are respectively clamped between covers 80 and 80' on one side, and tubular casing members 81 and 81' on the other, by means of bolts 82 and 82'. A disk 83 is clamped between said two tubular casing members 81 and 81' by means of bolts 82''. A rod 74 passes axially through disk 83 and covers 80 and 80' by means of fluid tight bearing rings 84, 85 and 86 in which said rod 74 is slidably mounted.

A V-shaped member 87 is also held by said nuts 82' against the flange of cover 80'. Said V-shaped member 87 carries a fork 88 connected at 48 to the vertical extension of plate member 41 of FIGURE 5.

Diaphragms 79 and 79' form with tubular casing members 81 and 81' two chambers 89 and 89' one on either side of the central disk 83 and said chambers 89 and 89' communicate by means of a small opening 90 provided in disk 83. Said chambers 89 and 89' are filled with a hydraulic fluid, such as oil, through openings 91 and 91' provided in casing members 81 and 81', which are normally closed by screwcaps 92 and 92'. A valve 93 is provided in the wall of tubular casing member 81 for the injection of hydraulic fluid under pressure so as to compress diaphragms 79 and 79' outwardly with respect to chambers 89 and 89', respectively.

The operation of the moderating means as hereinabove described in connection in the FIGURE 8 is similar to that of the corresponding means in FIGURE 5. As soon as there is a thrust or traction on rod 74 the hydraulic fluid tends to flow from one of the chambers 89 or 89' into the other through opening 90. But as this opening only has a small diameter the fluid flows slowly over a certain period of time, which avoids the headlights being tilted unnecessarily under the action of jolts and bumps which could otherwise be passed on to the tilting device through cable 60.

It can be seen that according to the invention, the flowing of the liquid through pipe 9 or 9' from sump 1 or 1' to sump 1a or 1'a, or the traction on cables 60 results in a tilting of the headlights of the vehicle proportionally to the load carried thereby and thus compensates for the vehicle's heaving so that the beams from the headlights are held at a constant range, and that the tilting angle of the headlights is altered only when an additional load is placed in the vehicle.

Numerous modifications obvious to any one skilled in the art may be brought to the hereinabove described embodiments of the invention without departing from the spirit and scope thereof as defined in the following claims.

What I claim is:

1. An improved device for the automatic adjustment of the headlights of a vehicle in relation to the load in said vehicle, in which the headlights are oscillatingly mounted on a substantially horizontal axis, comprising means for causing the headlights to tilt about said substantially horizontal axis, a lever mounted for oscillation on the body of the vehicle at the rear of said vehicle, resilient means for linking said lever to a rear axle of said vehicle and hydraulic transmission means for transmitting the movement of said lever to the headlights, said transmission means comprising a first sump located at the rear of the vehicle, filled with hydraulic fluid and having one wall formed with a resiliently deformable membrane, said membrane being connected to said lever, a hydraulic-mechanical transducer having a hydraulic input and a mechanical output, a hydraulic transmission circuit having one of its ends connected to said first sump, and its other end connected to said hydraulic input, and a mechanical connecting system linking said mechanical output of said transducer to the headlights to tilt said headlights about said horizontal axis.

2. A device according to claim 1, in which said transducer is a second sump having one wall formed with a resiliently deformable membrane.

3. A device according to claim 1, in which said mechanical connecting system comprises a shifting member adapted to be shifted transversely with respect to the beam axis of a headlight, said shifting member having a slot extending obliquely with respect to the said substantially horizontal axis, and being connected to a rod linked to said mechanical output of the transducer.

References Cited

UNITED STATES PATENTS

| 2,049,802 | 8/1936 | Hamm | 240—62.3 |
| 2,105,866 | 1/1938 | Sheaffer | 240—62 XR |
| 2,250,734 | 7/1941 | Thompson et al. | 240—62.3 |
| 3,177,355 | 4/1965 | Trowbridge | 240—62.4 XR |

FOREIGN PATENTS

| 926,229 | 4/1955 | Germany. |

NORTON ANSHER, *Primary Examiner.*

JOHN M. HORAN, *Examiner.*

F. L. BRAUN, *Assistant Examiner.*